United States Patent [19]

Keck

[11] Patent Number: 4,681,200
[45] Date of Patent: Jul. 21, 1987

[54] FRICTION CLUTCH

[75] Inventor: Karl Keck, Leutesheim, Fed. Rep. of Germany

[73] Assignee: Luk Lamellen und Kupplungsbau GmbH, Bühl, Fed. Rep. of Germany

[21] Appl. No.: 881,589

[22] Filed: Jul. 2, 1986

Related U.S. Application Data

[63] Continuation of Ser. No. 722,194, Apr. 11, 1985, abandoned, which is a continuation of Ser. No. 410,486, Aug. 23, 1982, abandoned.

[30] Foreign Application Priority Data

Sep. 16, 1981 [DE] Fed. Rep. of Germany ....... 3136711

[51] Int. Cl.⁴ ..................... F16D 13/44; F16D 25/08
[52] U.S. Cl. ................ 192/70.27; 192/89 B; 192/91 A
[58] Field of Search ............... 192/70.27, 70.28, 89 B, 192/101, 70.18, 85 CA, 91 A

[56] References Cited

U.S. PATENT DOCUMENTS

| | | | |
|---|---|---|---|
| 1,538,029 | 5/1925 | Detlaff | 192/70.18 |
| 2,211,191 | 8/1940 | Wolfram | 192/91 A |
| 2,684,742 | 7/1954 | Eason | 192/91 A |
| 2,714,437 | 8/1955 | Spase | 192/89 B X |
| 2,751,055 | 6/1956 | Dodge et al. | 192/89 B X |
| 2,801,722 | 8/1957 | Spase | 192/89 B X |
| 3,175,663 | 3/1965 | Glesmann | 192/70.28 X |
| 3,216,545 | 11/1965 | Schröter | 192/89 B X |
| 3,306,407 | 2/1967 | Smirl | 192/89 B X |
| 3,779,353 | 12/1973 | Maucher | 192/89 B X |
| 3,792,697 | 2/1974 | Walter et al. | 192/89 B X |
| 3,811,544 | 5/1974 | Maucher | 192/89 B |
| 4,069,905 | 1/1978 | De Gennes | 192/89 B X |
| 4,114,740 | 9/1978 | Sugiura et al. | 192/89 B X |
| 4,184,578 | 1/1980 | Moore et al. | 192/89 B |
| 4,195,719 | 4/1980 | Martinez | 192/70.27 X |
| 4,236,620 | 12/1980 | Beccaris | 192/89 B X |
| 4,300,669 | 11/1981 | Browne | 192/89 B |
| 4,326,611 | 4/1982 | Billet | 192/89 B |

FOREIGN PATENT DOCUMENTS

| | | | |
|---|---|---|---|
| 2231035 | 1/1974 | Fed. Rep. of Germany | 192/89 B |
| 2911085 | 9/1980 | Fed. Rep. of Germany | |
| 549308 | 10/1956 | Italy | 192/70.18 |
| 1474273 | 5/1977 | United Kingdom | 192/89 B |
| 0779679 | 11/1980 | U.S.S.R. | 192/101 |

*Primary Examiner*—Rodney H. Bonck
*Attorney, Agent, or Firm*—Peter K. Kontler

[57] ABSTRACT

A friction clutch wherein a hub carries a first plate which cannot rotate on the hub and a pressure plate which is non-rotatably connected with the first plate, e.g., by a set of axially stressed leaf springs urging the pressure plate axially and away from the first plate. A clutch disc is interposed between the two plates and is biased away from the first plate by a second set of axially stressed leaf springs. The pressure plate is connected with an annulus of axially parallel rivets extending through the first plate and having heads engaging with a ring or washer at the outer side of a prestressed diaphragm spring bearing against the first plate through the medium of an annular seat which is disposed radially outwardly of the rivets so that the diaphragm spring normally maintains the pressure plate in the engaged position by urging it against the clutch disc which, in turn, bears against the first plate. The pressure plate can be moved to the disengaged position to free the clutch disc by a disengaging bearing which is movable axially of the hub by a fluid-operated motor.

22 Claims, 5 Drawing Figures

FRICTION CLUTCH

This application is a continuation of application Ser. No. 722,194, filed Apr. 11, 1985, which is a continuation of Ser. No. 410,486, filed Aug. 23, 1982, now abandoned.

BACKGROUND OF THE INVENTION

The present invention relates to friction clutches in general, and more particularly to improvements in clutches which are designed to transmit driving torque in machines, apparatus or aggregates wherein the torque fluctuates with a high or very high degree of irregularity and within a wide range. Typical examples of such clutches are compressor clutches for use in automotive vehicles.

German Offenlegungsschrift Pat. No. 29 11 085 discloses a compressor clutch wherein an axially movable pressure plate is biased toward an axially fixed second plate by an annulus of tension springs which bear against the outer marginal portion of the pressure plate and react against a specially designed plate-like retainer. The pressure plate is movable to the disengaged position, against the opposition of tension springs, by an annulus of bolts which extend through the second plate and are movable by a fluid-operated disengaging unit including an axially movable ring acting upon those end portions of the bolts which are remote from the pressure plate.

The just discussed conventional clutch is complex and highly expensive to an extent which is not warranted and/or acceptable in spite of the rather specialized field of application of such types of clutches, namely, in machines or aggregates wherein the driving torque fluctuates extensively and at unpredictable intervals. The complexity of the aforediscussed clutch is attributable, at least in part, to the provision of the aforementioned specially designed retainer as well as to the provision of specially designed cup-shaped receptacles which accommodate the tension springs and extend through the second plate.

OBJECTS AND SUMMARY OF THE INVENTION

An object of the invention is to provide a clutch, especially a clutch for use in compressors or analogous aggregates, which is simpler, more compact and less expensive than but at least as reliable as heretofore known clutches.

Another object of the invention is to provide a friction clutch wherein the means for moving the pressure plate(s) and the clutch disc(s) to and from engaged position is constructed, assembled and mounted in a novel and improved way.

A further object of the invention is to provide a machine which embodies the improved clutch with novel and improved means for mounting and deforming the diaphragm spring which tends to maintain the pressure plate(s) and the clutch disc(s) in engaged position(s).

An additional object of the invention is to provide novel and improved means for connecting the diaphragm spring with the pressure plate(s) of the clutch.

Still another object of the invention is to provide the clutch with novel and improved means for moving the pressure plate(s) and the clutch disc(s) to disengaged or inoperative positions.

A further object of the invention is to provide a clutch of the above outlined character whose radial and/or axial dimensions need not exceed those of heretofore known compressor clutches or the like.

An additional object of the invention is to provide the clutch with novel and improved means for taking full mechanical advantage of the diaphragm spring during movement of the pressure plate(s) and clutch disc(s) to engaged or disengaged positions.

A further object of the invention is to provide a novel and improved method of assembling and operating a clutch of the above outlined character.

The invention is embodied on a friction clutch for transmission of driving torque in machines, apparatus or aggregates with a pronounced degree of irregularity of torque transmission, particularly in a compressor clutch. The clutch comprises a first component including an axially fixed first plate, a pressure plate located at one side of the first plate and movable axially between engaged and disengaged positions, and means for coupling the two plates for joint rotation. The clutch further comprises a second component including an axially movable clutch disc disposed between the two plates, and means for moving the pressure plate between engaged and disengaged positions including at least one rivet or another suitable motion transmitting element axially movably extending through the first plate and connected to the pressure plate. The moving means further comprises means for pulling the motion transmitting element or elements in a direction to move the pressure plate to the engaged position including a diaphragm spring at the other side of the first plate, and the clutch further comprises a seat for the diaphragm spring. Such seat is preferably disposed radially outwardly of the motion transmitting element or elements. The diaphragm spring and the seat are preferably constructed and assembled to effect the movement of the pressure plate to engaged position through the medium of the motion transmitting element(s) with increased power of action, i.e., with full or substantial mechanical advantage which is achieved due to lever action of the diaphragm spring. The seat is or can be interposed between the diaphragm spring and the first plate radially outwardly of the motion transmitting element(s), and such seat can include a ring made of steel wire or the like. The ring is preferably provided with an at least partly convex external surface (e.g., the ring can have a circular cross-sectional outline) which contacts the diaphragm spring and enables the latter to pivot or roll with reference to the seat.

Each motion transmitting element has an end portion which is remote from the pressure plate and is outwardly adjacent to the other side of the first plate, and the clutch can further comprise retaining means which is interposed between the diaphragm spring and the end portion(s) of the motion transmitting element(s) so that the diaphragm spring maintains the pressure plate in the engaged position through the medium of the motion transmitting element(s) and the retaining means when the diaphragm spring is free to bias and move the pressure plate toward the first plate so that the two plates engage the customary friction linings of the clutch disc. The retaining means can comprise an annular member.

The means for moving the pressure plate can comprise a full annulus of motion transmitting elements in the form of rivets or bolts whose shanks extend through the first plate and whose heads are outwardly adjacent to the first plate. The retaining means in such a clutch can comprise a ring (e.g., a wire ring) which is concentric with the two plates and is installed between the heads of the rivets and the diaphragm spring. The shanks of the rivets are disposed within the confines of the ring. Alternatively, the retaining means can comprise a washer which is connected to the heads or shanks of the rivets at the exposed side of the diaphragm spring so that the washer and the rivets cannot move axially with reference to each other. The washer can be provided with a ring-shaped second seat for the diaphragm spring, and such second seat can constitute a bead which is integral with the washer. The second seat is preferably disposed radially inwardly of the first mentioned seat and preferably radially inwardly of the shanks of the motion transmitting rivets.

The coupling means between the two plates can comprise a first set of axially stressed leaf springs which move the pressure plate to the disengaged position as soon as the actuating means causes the diaphragm spring to allow for such movement of the pressure plate. The second component can comprise a further member (e.g., a sleeve which is rotatable on a hub forming part of the first component and carrying the two plates), and the clutch then further comprises a second set of axially stressed leaf springs which tend to move the clutch disc away from the first plate, preferably through a distance which is less than (and can approximate one-half) the distance between the engaged and disengaged positions of the pressure plate.

The novel features which are considered as characteristic of the invention are set forth in particular in the appended claims. The improved clutch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
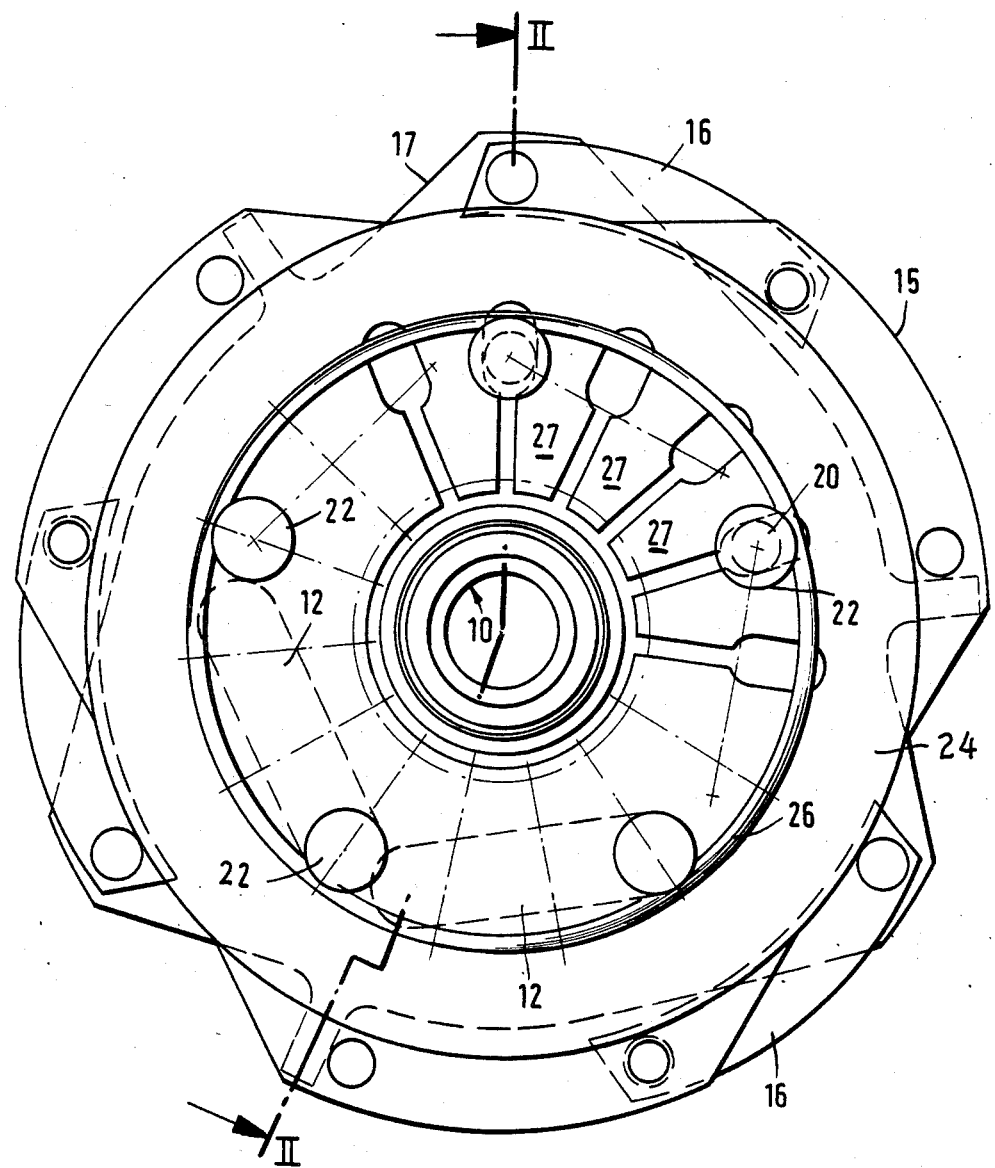
FIG. 1 is an end elevational view of a clutch which embodies one form of the invention and includes a single pressure plate as well as a single clutch disc.
Figure 2:
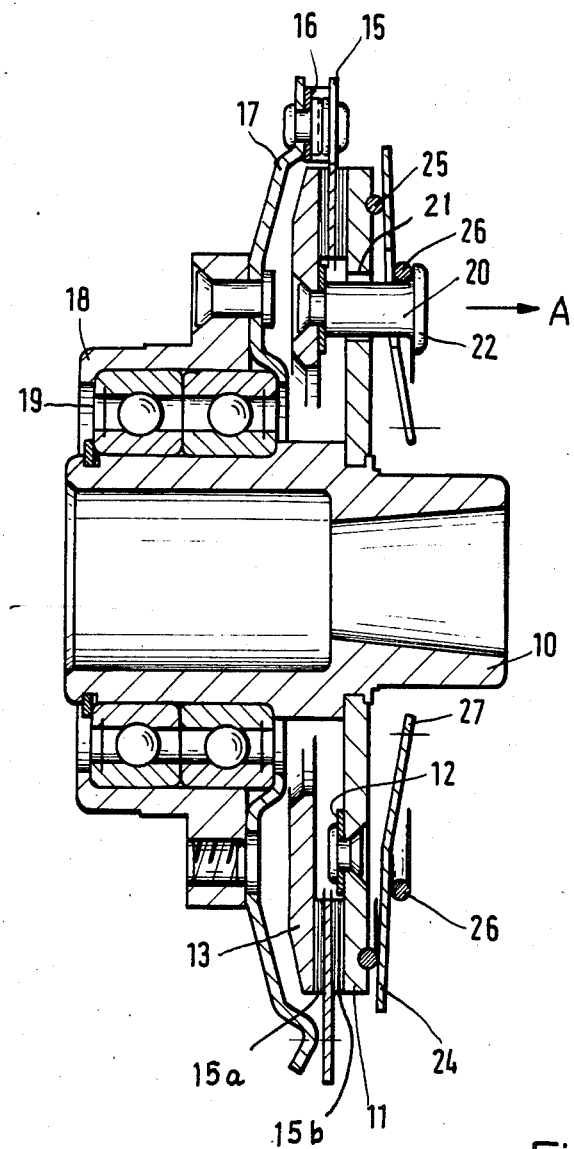
FIG. 2 is a sectional view substantially as seen in the direction of arrows from the line II—II of FIG. 1.

The clutch which is shown in FIGS. 1 and 2 comprises a first component including a hub 10, a first plate 11 which surrounds the hub and is non-rotatably secured thereto, and a second plate or pressure plate 13 which is movable axially of the hub 10 and is biased by a set of prestressed leaf springs 12. One end portion of each spring 12 is connected to the first plate 11, the other end portion of each leaf spring 12 is connected to the pressure plate 13, and the initial stressing of these leaf springs is such that they tend to move the pressure plate 13 in a direction to the left, as viewed in FIG. 2. The first component including the hub 10 and the plates 11, 12 is assumed to be the driving component of the clutch which further comprises a second or driven component including a clutch disc 15 with a pair of friction facings or linings 15a, 15b and a further member or housing 17 which is connected to the clutch disc 15 by a set of leaf springs 16. Each leaf spring 16 is connected to the clutch disc 15 by a first rivet and to the member or housing 17 by a second rivet. When the pressure plate 13 is held in the engaged position which is shown in FIG. 2, it engages the adjacent friction lining 15a and urges the other lining 15b into engagement with the left-hand side of the plate 11. The first component then transmits torque to the second component which latter further includes a sleeve-like member 18 riveted to the member 17 and mounted on the hub 10, and more specifically on two antifriction ball bearings 19 which are disposed in the space between the hub and the member 18. The members 17, 18 of the second component can rotate about but cannot move axially of the hub 10. The leaf springs 16 enable the clutch disc 15 to move between the (engaged) position of FIG. 2 and a second position through a distance which can approximate or equal half the distance covered by the pressure plate 13 during movement from the engaged position of FIG. 2 to a disengaged position at a greater distance from the plate 11.

The means for moving the pressure plate 13 between its engaged and disengaged positions comprises an annulus of equidistant motion transmitting elements in the form of rivets or bolts 20 each having a shank which extends through a hole 21 in the plate 11 in parallelism with the axis of the hub 10 and each of which is rigidly connected with the pressure plate 13. The enlarged end portions or heads 22 of the rivets 20 are adjacent to the outer side of and are spaced apart from the plate 11. The heads 22 retain and stress a diaphragm spring 24 which cooperates with the rivets 20 to normally maintain the pressure plate 13 in the engaged position of FIG. 2. A ring-shaped seat 25 is interposed between the diaphragm spring 24 and the outer side of the plate 11. The diameter of the seat 25 is such that the latter spacedly surrounds the annulus of rivets 20. The illustrated seat 25 can constitute an endless piece of wire having an at least partially convex external surface (the cross-sectional outline of the seat 25 can constitute a circle) so as to allow for convenient tilting or rolling of the diaphragm spring 24 between the position of FIG. 2 and a second position in which the leaf springs 12 are free to pull the pressure plate 13 to its disengaged position so that the clutch disc 15 can be disengaged from the plates 11 and 13 under the action of the leaf springs 16.

The improved clutch comprises an annular retaining member 26 in the form of a ring which preferably consists of spring steel and is adjacent to the exposed side of the diaphragm spring 24; it is overlapped by portions of the heads 22 in such a way that the shanks of the entire annulus of motion transmitting rivets 20 are located within the confines of the ring 26. The diaphragm spring 24 is stressed in a direction to urge its radially inwardly extending prongs 27 away from the axially fixed first plate 11. In other words, the diaphragm spring 24 exerts upon the shanks of the rivets 20 (and hence upon the pressure plate 13) a pull in the direction of arrow A, and such pull is transmitted to the shanks of the rivets 20 through the medium of the retaining ring 26 and heads 22. The prongs 27 can be moved in a direction toward the plate 11 by a release bearing (e.g., a bearing 238 of the type shown in FIG. 4) to thereby enable the leaf springs 12 to pull the pressure plate 13 away from the plate 11 and clutch disc 15. As explained above, the clutch disc 15 is then pulled by the leaf springs 16 so that it moves away from the plate 11 and comes to a halt in a position preferably midway between the plates 11 and 13 (when the latter plate assumes its disengaged position).

The mechanical advantage of the lever means which is constituted by the diaphragm spring 24 can be readily selected in such a way that the motion transmitting rivets 20 can effect a movement of the pressure plate 13 to engaged position with increased power of action. The maker of the clutch can select such power by the simple expedient of adequately relating the diameter of the seat 25 to the diameter of the retaining ring 26.

The improved clutch exhibits numerous advantages over the heretofore known compressor clutches. Thus, the seat 25 can bear directly against the axially fixed plate 11 so that a specially designed complex retainer for the diaphragm spring can be dispensed with. Also, the diaphragm spring 24 replaces an entire annulus of coil springs and discrete receptacles for such coil springs which are needed in heretofore known compressor clutches. The seat 25 can be replaced by any other suitable seat which enables the diaphragm spring 24 to roll therealong when the prongs 27 are depressed toward the axially fixed plate 11 in order to allow for movement of the pressure plate 13 to its disengaged position. Another important advantage of the improved clutch is that the ring 26 can be properly held by the simple expedient of enlarging those end portions (22) of the rivets 20 which are disposed at the outer side of and are spaced apart from the plate 11.

A further important advantage of the improved clutch is that the clutch disc 15 can be adequately and reliably separated from the plates 11 and 13 by the simple expedient of properly stressing the leaf springs 12 and 16. This is desirable and advantageous because the driven component can be brought to a halt practically immediately in response to disengagement of the clutch, i.e., as soon as the prongs 27 of the diaphragm spring 24 are sufficiently deformed to enable the leaf springs 12 to move the pressure plate 13 to its disengaged or retracted position.

Figure 3:
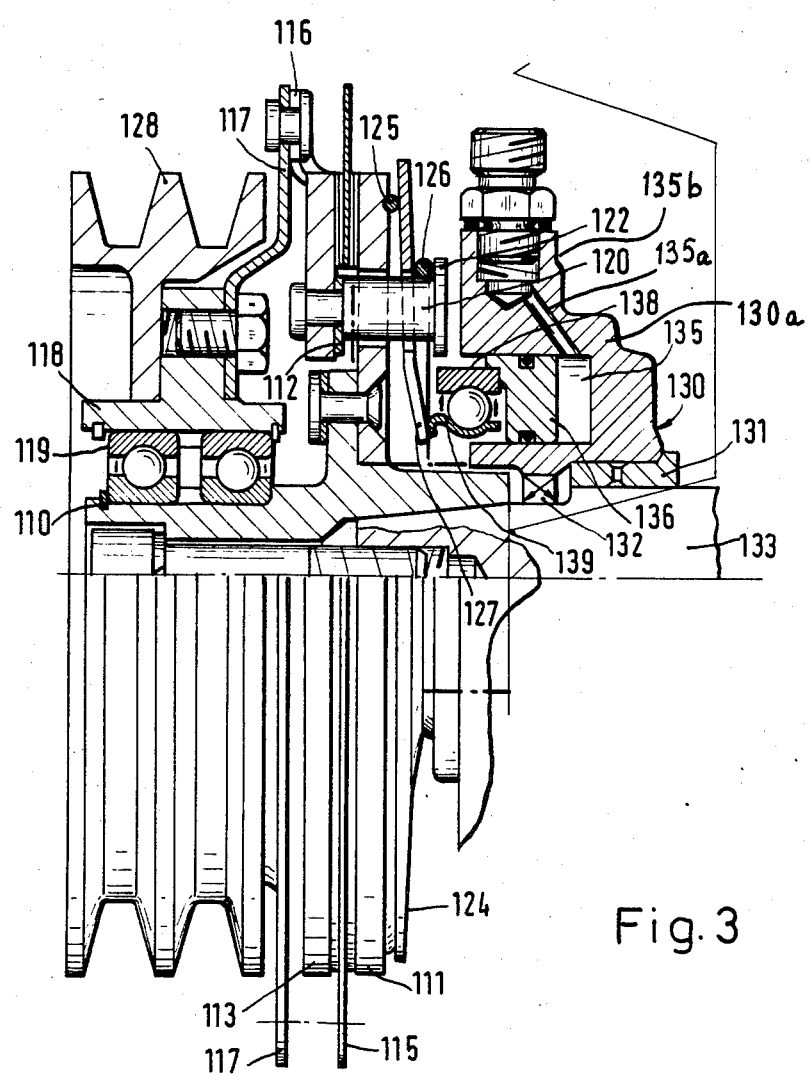
FIG. 3 is a partly side elevational and partly axial sectional view of a second clutch wherein the pressure plate is movable to disengaged position by a fluid-operated motor.

All such parts of the clutch shown in FIG. 3 which are identical with or clearly analogous to corresponding parts of the clutch of FIGS. 1 and 2 are denoted by similar reference characters plus 100. The member 117 can be said to constitute a housing and is fixedly connected to the member 118 which rotates on antifriction bearings 119 surrounding the respective portion of the hub 110. The reference character 128 denotes a pulley for a V-belt (not shown) which receives motion from the hub 110 when the clutch is engaged, i.e., when the clutch disc 115 is frictionally held between the axially fixed plate 111 and the axially movable pressure plate 113. Alternatively, the pulley 128 can drive the hub 110 when the clutch is engaged, depending upon whether a prime mover transmits torque to the first or to the second component of the clutch.

FIG. 3 further shows a fluid-operated clutch actuating unit 130 which is mounted on a bearing sleeve 131 and surrounds an antifriction bearing 132. The bearing 132 surrounds a drive shaft 133 which transmits torque to the hub 110. The unit 130 has a cylinder 130a defining an annular cylinder chamber 135 for a ring-shaped piston 136 which is reciprocable with a release bearing 138. The outer race of the bearing 138 is nonrotatably secured to the piston 136, and its inner race 139 has a ring-shaped extension which can engage the prongs 127 of the diaphragm spring 124 to move such prongs in a direction toward the axially fixed plate 111 whereby the prestressed leaf springs 112 can retract the pressure plate 113 to the disengaged position. When the cylinder chamber 135 is free to communicate with the sump (not shown), the prestressed diaphragm spring 124 is free to reassume the position shown in FIG. 3 (by pivoting relative to its seat 125) whereby the retaining ring 126 acts upon the heads 122 of the rivets 120 so that the pressure plate 113 is returned to the engaged position of FIG. 3 and cooperates with the plate 111 to properly engage the clutch disc 115 whereby the latter transmits torque to the pulley 128 through the medium of the set of prestressed leaf springs 116 and members 117, 118 of the driven component. The leaf springs 112 hold the pressure plate 113 against rotation relative to the plate 111, and the leaf springs 116 hold the clutch disc 115 against rotation relative to the members 117, 118. However, the pressure plate 113 and the clutch disc 115 are free to move axially of the hub 110 when the diaphragm spring 124 is deformed by the inner race 139 of the release bearing 138. The leaf springs 112, 116 are functional equivalents of the leaf springs 12, 16, i.e., the springs 112 tend to move the pressure plate 113 to the disengaged position through a predetermined distance which is or can be twice the distance covered by the clutch disc 115 under the action of the leaf springs 116 when the pressure plate 113 is free to assume its disengaged position. FIG. 3 shows the pressure plate 113 in the engaged position, i.e., the inner race 139 of the release bearing 138 is adjacent to but does not apply any appreciable force to the prongs 127 so that the diaphragm spring 124 is free to pull the rivets 120 which, in turn, maintain the pressure plate 113 in adequate frictional engagement with the respective liner of the clutch disc 115 whereby the other liner of the disc 115 is held in adequate frictional engagement with the plate 111.

The stroke of the piston 136 (in response to admission of a pressurized fluid (e.g., oil) into the cylinder chamber 135) is selected in such a way that the inner race 139 of the release bearing 138 deforms the prongs 127 with the result that the diaphragm spring 124 pivots relative to its seat 125 whereby the leaf springs 112 are free to move the pressure plate 113 axially to its retracted position. The leaf springs 116 not only prevent any rotation of the clutch disc 115 relative to the members 117, 118 but they also ensure that the clutch disc 115 is disengaged from the plates 111, 113 in response to depression of the prongs 127. In other words, the clutch disc 115 assumes a retracted or disengaged position in which its friction liners are remote from the plates 111 and 113 as soon as the springs 112 are free to move the pressure plate 113 to its disengaged or retracted position. The initial stressing of the diaphragm spring 124 is sufficiently pronounced to ensure that the pressure plate 113 is automatically returned to the illustrated engaged position as soon as the fluid which fills the chamber 135 is free to flow back to the sump (note the channel 135a and nipple 135b) under the action of the prongs 127 which act upon the inner race 139 of the release bearing and push the piston 136 deeper into the cylinder 130a. The diaphragm spring 124 then pulls the rivets 120 (through the medium of the ring 126) to urge the pressure plate 113 against the clutch disc 115 which, in turn, is urged against the axially fixed plate 111.

Figure 4:
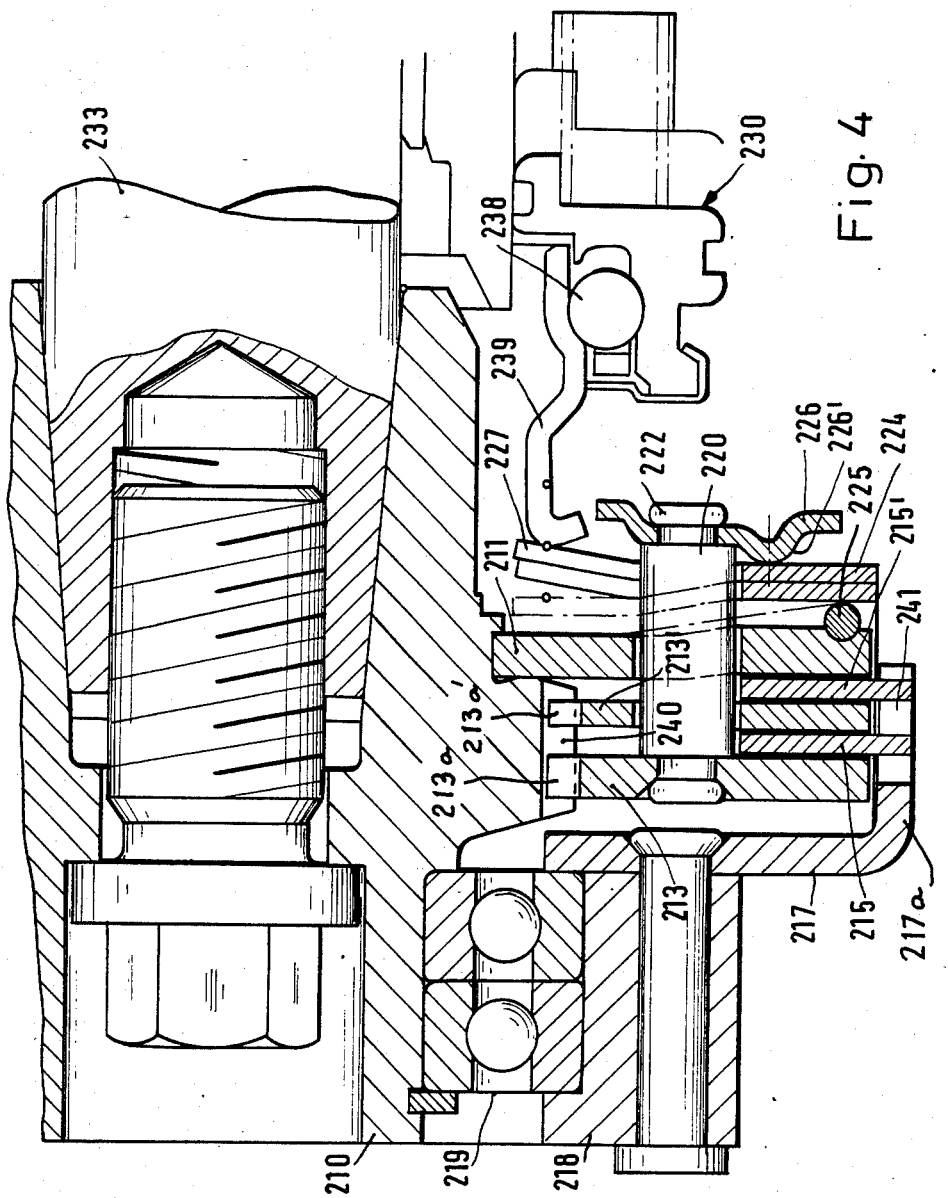
FIG. 4 is a fragmentary axial sectional view of a third clutch with several clutch discs and several pressure plates.

FIG. 4 shows a portion of a third clutch wherein all such parts which are identical with or clearly analogous to corresponding parts of the clutch shown in FIGS. 1 and 2 are denoted by similar reference characters plus 200. The clutch of FIG. 4 is a multiple-disc clutch wherein the space between the axially fixed plate 211 (this plate is non-rotatably secured to the hub 210 of the first component) and the axially movable pressure plate 213 accommodates two discrete clutch discs 215, 215′ and a second pressure plate 213′. The latter is disposed between the clutch discs 215 and 215′. The pressure plates 213, 213′ have teeth 213a, 213a′ which surround their central openings and are reciprocable in axially parallel external splines 240 of the hub 210. The hub 210 receives torque from a shaft 233. Analogously, the member 217 of the second component has a cylindrical portion 217a with one or more axially parallel slots 241 for external teeth of the clutch discs 215, 215′. Thus, the pressure plates 213, 213′ can move axially of but cannot rotate relative to the hub 210, and the clutch discs 215, 215′ can move axially of but are held against rotation with reference to the member 217. The member 218 is rigidly connected with the member 217 and is rotated on antifriction roller or ball bearings 219 which surround the respective portion of the hub 210.

Figure 5:
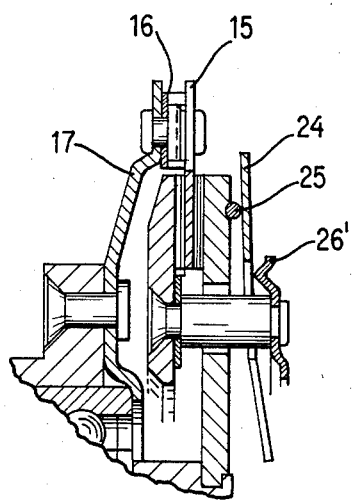
FIG. 5 is a fragmentary sectional view similar to that of FIG. 2 but showing modified retaining means for the diaphragm spring.

The means for moving the pressure plate 213 between the engaged position of FIG. 4 and a disengaged position comprises an annulus of motion transmitting elements in the form of bolts or rivets 220 having heads 222 which engage a washer-like retaining member 226 having an integral ring-shaped bead 226′ constituting a seat for the outer side of the diaphragm spring 224. The seat 226′ is disposed radially inwardly of the seat 225 which latter is installed between the diaphragm spring 224 and the axially fixed plate 211. The shanks of the rivets 220 extend through openings in the intermediate pressure plate 213′ and axially fixed plate 211. The member 226 can be mass-produced from sheet metal by resorting to a stamping, punching or any other suitable mass-producing technique. A similar washer-like retaining member 26′ is shown in FIG. 5 as a substitute for the retaining means 26 of FIG. 2. The member 26′ has an integral ring-shaped bead constituting a seat for the diaphragm spring 24 and located radially inwardly of the seat 25.

The construction of the actuating unit 230 is or can be analogous to that of the unit 130 shown in FIG. 3. The release bearing 238 has an inner race 239 which can engage and depress the prongs 227 of the diaphragm spring 224 to thereby enable the rivets 220 to move the pressure plate 213 to its disengaged position when the unit 230 advances the bearing 238 in a direction to the left, as viewed in FIG. 4. In this embodiment of the improved clutch, the shanks of the rivets 220 perform the function of the spring 12 or 112, i.e., they actually move the pressure plate 213 to its disengaged position.

The bead 226′ can be formed by the simple expedient of causing the corresponding portion of the member 226 to bulge beyond the general plane of this member.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch for the transmission of driving torque in machines with a pronounced degree of irregularity of torque transmission, particularly a compressor clutch, comprising a first component including an axially fixed first plate having a first side and a second side, a pressure plate located at said first side and movable axially between engaged and disengaged positions, and means for coupling said plates for joint rotation including a first set of axially stressed leaf springs; a second component including an axially movable clutch disc disposed between said plates, a further member and a second set of axially stressed leaf springs for centering and non-rotatably coupling said clutch disc with said further member; means for moving said pressure plate between said positions including at least one motion transmitting element axially movably extending through said first plate and connected to said pressure plate and means for pulling said motion transmitting element in a direction to move said pressure plate to the engaged position including a prestressed diaphragm spring at the second side of said first plate, said motion transmitting element being rigid with said pressure plate and having an end portion remote from said pressure plate and outwardly adjacent to the second side of said first plate; retaining means provided in the region of said end portion of said motion transmitting element, said diaphragm spring being tiltable relative to said retaining means; and a seat for said diaphragm spring.

2. The clutch of claim 1, wherein said seat is disposed radially outwardly of said motion transmitting element.

3. The clutch of claim 1, wherein said seat is interposed between said diaphragm spring and said first plate radially outwardly of said motion transmitting element.

4. The clutch of claim 4, wherein said seat includes a ring.

5. The clutch of claim 4, wherein said ring has an at least partly convex external surface which contacts said diaphragm spring and enables the latter to pivot with reference to said seat.

6. The clutch of claim 1, wherein said retaining means is interposed between said diaphragm spring and said end portion so that said diaphragm spring maintains the pressure plate in the engaged position through the medium of said motion transmitting element and said retaining means.

7. The clutch of claim 1, wherein said retaining means comprises an annular member.

8. The clutch of claim 1, wherein said motion transmitting element includes a rivet having a shank extending through said first plate and a head constituting said end portion, said retaining means comprising a ring which is concentric with said plates and is installed between said head and said diaphragm spring.

9. the clutch of claim 8, wherein said ring is a wire ring.

10. The clutch of claim 8, wherein said moving means comprises an annulus of rivets and the shanks of the rivets forming said annulus are disposed within the confines of said ring.

11. The clutch of claim 1, wherein said moving means comprises a plurality of motion transmitting elements and said retaining means comprises a washer connected with said elements against axial movement with reference thereto.

12. The clutch of claim 11, wherein said washer has a ring-shaped second seat for said diaphragm spring.

13. The clutch of claim 12, wherein said second seat includes a bead which is integral with said washer.

14. The clutch of claim 12, wherein said second seat is disposed radially inwardly of said first named seat.

15. The clutch of claim 1, wherein the leaf springs of said first named and second sets are respectively arranged to urge said pressure plate and said clutch disc through different distances in a direction away from said first plate.

16. The clutch of claim 15, further comprising actuating means operable to move said pressure plate to the disengaged position through the medium of said diaphragm spring and said motion transmitting element, the leaf springs of said first set being arranged to determine the disengaged position of said pressure plate and the distance through which the leaf springs of said first set move said pressure plate from the engaged to the disengaged position exceeding the distance through which said clutch disc is moved away from said first plate by the second set of springs in response to movement of said pressure plate to the disengaged position.

17. The clutch plate of claim 16, wherein the distance through which said clutch disc is moved at least approximates half the distance between the engaged and disengaged positions of said pressure plate.

18. The clutch of claim 1, wherein said first component further comprises a hub non-rotatably connected with said plates and said further member is rotatable on said hub.

19. The clutch of claim 1, wherein said clutch disc has linings engageable with said first plate and said pressure plate and the leaf springs of said first set are disposed radially inwardly of said linings.

20. The clutch of claim 1, wherein said clutch disc has linings engageable with said first plate and said pressure plate and the leaf springs of said second set are disposed radially outwardly of said linings.

21. The clutch of claim 1, wherein the leaf springs of said first set are disposed between said first plate and said pressure plate, as considered in the axial direction of said plates.

22. The clutch of claim 1, wherein said moving means includes a plurality of motion transmitting elements which connect the leaf springs of said first set to said pressure plate.

* * * * *